Patented Sept. 24, 1929

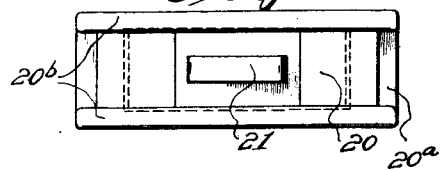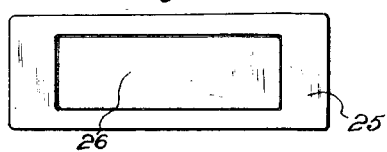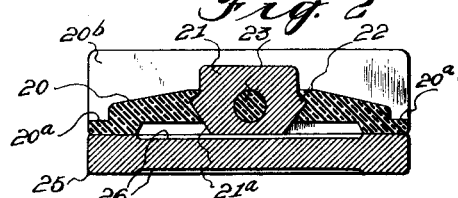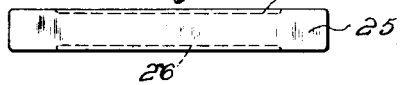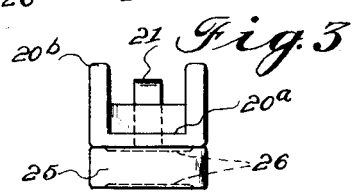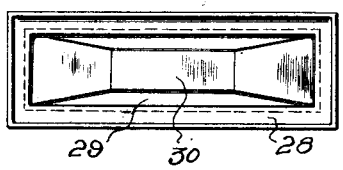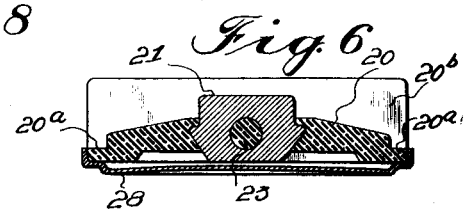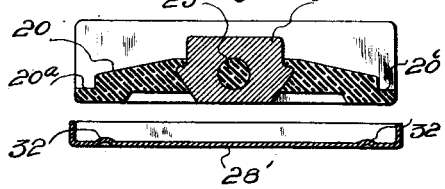

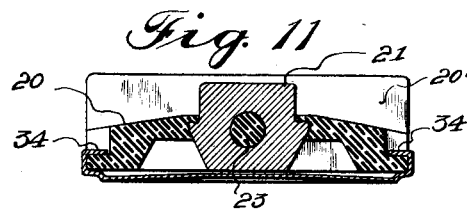
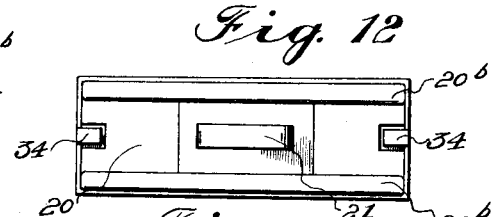
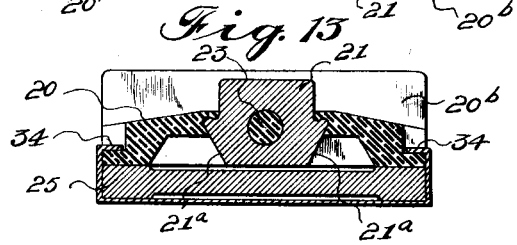
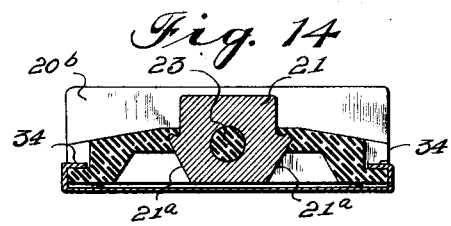
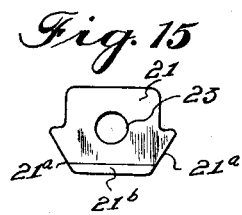
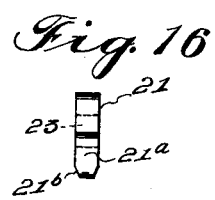
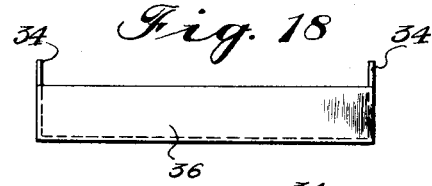
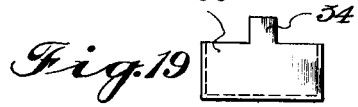

1,729,053

UNITED STATES PATENT OFFICE

LEWIS H. ROVERE, OF RICHMOND, NEW YORK, EVERETT V. MOTT, OF METUCHEN, NEW JERSEY, AND ROBERT C. AYERS, OF BROOKLYN, NEW YORK, ASSIGNORS TO THE WESTERN UNION TELEGRAPH COMPANY, OF NEW YORK, N. Y., A CORPORATION OF NEW YORK

ELECTRICAL PROTECTIVE DEVICE

Application filed May 19, 1925. Serial No. 31,389.

This invention relates to devices for protecting electrical circuits, such as telegraph and telephone lines, from the destructive action of heavy potentials or charges due to electrical disturbances of any kind.

The type of arresters commonly employed to protect cables and apparatus against breakdowns which might result from excessive voltages arising from lightning or static charges and from accidental contacts between the telegraph or telephone line wires and high tension conductors, usually consist of two electrodes of metal or carbon separated by a very narrow air-gap, the thickness of which is accurately maintained by a separator of insulating material.

Our object of the present invention is to provide a protector of the open space type in which the air-gap is accurately determined by the construction of the electrodes without the use of separators or other spacing devices. A further object is to provide an arrester or protective device in which the time required for the grounding of the arrester as a result of arcing between the two electrodes may be closely predetermined and controlled by varying the shape or arcing contour of one of the electrodes.

In the accompanying drawings which will be referred to in the following detailed description, Figures 1, 2 and 3 are a top plan, a longitudinal section and an end elevation, respectively, of one form of our invention; Figures 4 and 5 are a top plan and a side elevation, respectively, of the ground block or electrode shown in the previous figures; Figure 6 is a longitudinal vertical section, of another form of our invention in which the ground electrode consists of a stamped metal plate, the latter being shown in top plan and in end elevation, respectively, in Figures 7 and 8; Figure 9 is a longitudinal vertical sectional view of a further modification; Figure 10 is a top plan view of the ground electrode or plate shown in Figure 9; Figures 11 and 12 are a longitudinal vertical section and a top plan view, respectively, of the form shown in Figure 7, but with the electrodes permanently secured together into a unitary structure; Figures 13 and 14 are longitudinal vertical sectional views of permanently assembled arresters corresponding to the constructions shown in Figures 2 and 9, respectively; Figures 15 and 16 are, respectively, side and end elevations of the line block electrode insert; and Figures 17, 18, and 19 are respectively a top plan, a side elevation, and an end elevation of the ground block fastening plate.

A protector or arrester embodying the features of our invention comprises a line block composed of insulator member 20 with an electrode 21 molded therein. The molded insulator member may be composed of a material which softens between 150° and 1000° F. depending upon the conditions for which it is intended. Likewise the electrode insert 21 may be composed of different materials depending upon the conditions under which the protector will be used, and may consist of graphite, carbon, carborundum, tungsten, an alloy which will not easily become pitted under slight discharges, such as manganese nickel, or nickel chrome or other alloy or conducting material possessing the desired properties.

The electrodes is preferably provided with shoulders 22 and with a hole 23 into which the insulating material may flow to rigidly keep the electrode in position. The block is provided as usual with end flanges 20$^a$ and outwardly extending side flanges 20$^b$.

The electrode is preferably made with tapering sides 21$^a$. The lateral edges may also be chamfered as indicated at 21$^b$. We have discovered that by varying the shape of the electrode 21, as by modifying the taper of the sides and also by changing the diameter of the central hole, we can vary the time required for the grounding of the arrester as a result of arcing between the two electrodes. This period of time required for the electrodes to come into contact to form a complete conducting path and ground the arrester after the arc has been established between the electrodes may be varied over quite a wide range. This time interval can be varied by the tapering of the sides because as the line electrode moves toward the other electrode, an increasing amount of the insulating body holding the electrode must be moved or expanded. Likewise the time interval can be altered by varying the size of the hole in the body of the electrode, since this varies the amount of material which must be softened or sheared before the electrode can move in the insulating body. We thus have a method of predetermining the operation of the arresters and closely controlling the time required for grounding and we are thereby enabled to design and construct arresters which are required to operate under different conditions.

After the line block has been molded the inner surfaces of the insulator ends and the electrode are accurately ground flush to the same plane. In the forms shown in Figures 1, 2 and 12, the cooperating electrode or ground block 25 consists of a plate or block of carbon or other suitable refractory conducting material. The opposite faces are hollowed or ground to form a depressed area 26, accurately of uniform depth to provide exactly the desired air-gap between the two electrodes when the parts are assembled.

In the form shown in Figure 6, the ground block or base block 28, which constitutes the cooperating electrode, consists of a metal plate of suitable material which is stamped into the shape indicated in Figures 7 and 8 with side and end flanges to snugly fit about the edges of the line block, the central portion being depressed, preferably with a marginal groove 29, the middle part 30 being accurately gauged to leave the proper air-gap with the electrode 21 when the parts are assembled.

The form shown in Figure 9 differs from the form of Figure 6 in having the entire body of the sheet metal electrode 28′, forming the ground block, within the flanges in the same plane, the air-gap being formed by small projections 32 stamped up at opposite ends. These projections may be made very accurately so that the electrodes will be exactly correct when the parts are assembled.

The forms shown on sheet 2 of the drawings differ from those shown on sheet 1 in having the assembled parts of the arrester permanently fastened together. In the forms shown in Figures 11 and 14, the sheet metal ground electrode or block is provided with a tongue 34 at each end, which is bent over the end flanges of the insulating member of the line block.

In the form shown in Figure 13, an additional sheet metal member 36 is provided having side and end flanges to encase the sides and ends of the ground block or electrode 25, the end flanges having tongues 34 which are bent over the ends or into notches in the ends of the insulator part of the line block to securely fasten the parts of the protector together.

We claim:—

1. A protector for electric circuits, comprising a molded body of insulating material becoming plastic when heated above a predetermined temperature, said body having a recessed inner face with end bearing surfaces, an electrode molded in said body and having its inner portion wedge-shaped and protruding within said recess, said protruding portion having an extended plane surface between the inclined end surfaces, and an opposing electrode comprising a conducting block or plate having bearing portions to engage said bearing surfaces and a central plane surface spaced from said first-named plane surface a distance equal to the desired arcing air-gap.

2. A protector for electric circuits, comprising a molded body of insulating material becoming plastic when heated above a predetermined temperature, said body having a recessed inner face with end bearing surfaces, an electrode molded in said body and having an inner wedge-shaped portion, the innermost part of said wedge-shaped portion protruding into said recess, and an opposing electrode comprising a conducting block or plate engaging said bearing surfaces and spaced from the inner surface of said electrode a distance equal to the desired arcing air-gap.

3. A protector for electric circuits, comprising a molded body of insulating material becoming plastic when heated above a predetermined temperature, said body having a recessed inner face with end bearing surfaces, an electrode molded in said body and having an inner wedge-shaped portion, the innermost part of said wedge-shaped portion protruding into said recess, the opposite edges of said wedge-shaped portion being inclined at an angel to provide a predetermined interval between the softening of the insulating molded body and the movement of the electrode, and an opposing electrode comprising a conducting block or plate engaging said bearing surfaces and spaced from the inner surface of said electrode a distance equal to the desired arcing air-gap.

In testimony whereof, we affix our signatures.

LEWIS H. ROVERE.
EVERETT V. MOTT.
ROBERT C. AYERS.